(12) United States Patent
Weathers et al.

(10) Patent No.: US 11,053,030 B2
(45) Date of Patent: Jul. 6, 2021

(54) LOAD-DECOUPLING ATTACHMENT SYSTEM

(71) Applicant: THE BOEING COMPANY, Chicago, IL (US)

(72) Inventors: Jeffrey W. Weathers, Huntsville, AL (US); Kraig A. Behel, Athens, AL (US); Mark W. Ullom, Huntsville, AL (US)

(73) Assignee: THE BOEING COMPANY, Chicago, IL (US)

( * ) Notice: Subject to any disclaimer, the term of this patent is extended or adjusted under 35 U.S.C. 154(b) by 418 days.

(21) Appl. No.: 16/154,817

(22) Filed: Oct. 9, 2018

(65) Prior Publication Data

US 2020/0108954 A1   Apr. 9, 2020

(51) Int. Cl.
*B64G 1/40* (2006.01)
*B64G 1/64* (2006.01)
*F16B 7/04* (2006.01)

(52) U.S. Cl.
CPC .............. *B64G 1/641* (2013.01); *B64G 1/40* (2013.01); *F16B 7/04* (2013.01)

(58) Field of Classification Search
CPC ................................. B64G 1/402; B64G 1/641
See application file for complete search history.

(56) References Cited

U.S. PATENT DOCUMENTS

| 5,927,653 | A  | * | 7/1999  | Mueller ............. | B64G 1/14   |
|           |    |   |         |                      | 244/138 R   |
| 6,402,091 | B1 | * | 6/2002  | Hansen ............... | B64G 1/401  |
|           |    |   |         |                      | 239/265.35  |
| 6,793,183 | B1 | * | 9/2004  | Hand ................. | B64G 1/641  |
|           |    |   |         |                      | 244/158.1   |
| 8,973,873 | B2 | * | 3/2015  | Aston ................ | B64G 1/402  |
|           |    |   |         |                      | 244/172.3   |
| 9,180,984 | B2 | * | 11/2015 | Peterka, III ........ | B64G 1/242  |
| 9,234,561 | B2 | * | 1/2016  | Laurens .............. | B64G 1/641  |
| 10,532,833| B2 | * | 1/2020  | Duchemin ............ | F02K 9/76   |

\* cited by examiner

*Primary Examiner* — Joshua J Michener
*Assistant Examiner* — Michael B. Kreiner
(74) *Attorney, Agent, or Firm* — The Small Patent Law Group LLC; Joseph M. Butscher

(57) ABSTRACT

A load-decoupling attachment system is configured to secure a component to a primary structure. The load-decoupling system includes a fore end coupling bracket that is configured to attach to a fore end of the component. A first tie rod is coupled to the fore end coupling bracket. The first tie rod is configured to couple to a first portion of the primary structure. A second tie rod is coupled to the fore end coupling bracket. The second tie rod configured to couple to a second portion of the primary structure. A universal joint mount assembly is configured to couple to an aft end of the component and a third portion of the primary structure.

20 Claims, 9 Drawing Sheets ly relate to1
LOAD-DECOUPLING ATTACHMENT SYSTEM

STATEMENT REGARDING FEDERALLY SPONSORED RESEARCH OR DEVELOPMENT

The invention described herein was made in the performance of work under NASA Contract No. NNM07AB03C and is subject to the provisions of Section 305 of the National Aeronautics and Space Act of 1958 (72 Stat. 435: 42 U.S.C. 2457).

FIELD OF THE DISCLOSURE

Embodiments of the present disclosure generally relate to a load-decoupling attachment system, such as may be used to attach a component to another structure.

BACKGROUND OF THE DISCLOSURE

Various vehicles have numerous components that are connected together. For example, a vehicle may include a frame and a host of different components secured to the frame.

Aeronautical and space vehicles include avionics and propulsion systems. Certain components may be relatively large and massive. During operation, the components may move relative to one another. As such, forces may be translated between the various components.

Structural coupling between a primary load path and system components (for example, avionics, propulsion, and other such components) is analyzed during design stages of air and space vehicles. In vehicles that are subjected to cryogenic temperatures, high pressure tank growth, and large structural deflections (such as space launch vehicles), direct coupling between certain components may create excessive loads between component(s) and other structures.

SUMMARY OF THE DISCLOSURE

A need exists for an attachment system that decouples load transmission between a component and a primary structure. Further, a need exists for an attachment system that structurally isolates avionics and propulsion components from a primary load path within a vehicle.

With those needs in mind, certain embodiments of the present disclosure provide a load-decoupling attachment system that is configured to secure a component to a primary structure. The load-decoupling system includes a fore end coupling bracket that is configured to attach to a fore end of the component. A first tie rod is coupled to the fore end coupling bracket. The first tie rod is configured to couple to a first portion of the primary structure. A second tie rod is coupled to the fore end coupling bracket. The second tie rod is configured to couple to a second portion of the primary structure. A universal joint mount assembly is configured to couple to an aft end of the component and a third portion of the primary structure. The first tie rod, the second tie rod, and the universal joint mount assembly are configured to attach the component to the primary structure such that the loads associated with the component are decoupled from the loads associated with the primary structure.

In at least one embodiment, the fore end coupling bracket includes a first lug and a second lug. The first tie rod couples to the first lug, and the second tie rod couples to the second lug. Spherical bearings may be coupled to the first lug and the second lug. For example, each of the first tie rod and the second rod may be coupled to a spherical bearing that is received and secured within the first lug and the second lug in the fore end coupling bracket.

In at least one embodiment, the universal joint mount assembly includes a mounting bracket having first yoke arms. An aft end coupling bracket is configured to attach to the aft end of the component. The aft end coupling bracket has second yoke arms. A gimbal frame is pivotally coupled to the first yoke arms of the mounting bracket and the second yoke arms of the aft end coupling bracket.

The component may be an avionics or propulsion component of a vehicle. The primary structure may be a frame within the vehicle.

Each of the first tie rod and the second tie rod may include a longitudinal support beam that securely retains a first coupling clevis at a first end and a second coupling clevis at a second end that is opposite from the first end.

The load-decoupling attachment system may also include a first mounting protuberance that is configured to couple the first tie rod to the first portion of the primary structure, and a second mounting protuberance that is configured to couple the second tie rod to the second portion of the primary structure. Each of the first mounting protuberance and the second mounting protuberance may include a panel and a fin extending from the panel. A channel is formed through the fin. The channel retains a spherical bearing.

In at least one embodiment, the first tie rod and the second tie rod connect to the fore end coupling bracket at an angle therebetween. Longitudinal axes of the first tie rod and the second tie rod are not longitudinally aligned.

Certain embodiments of the present disclosure provide a load-isolating system that includes a primary structure, a component, and a load-decoupling attachment system that connects the component to the primary structure. The load-decoupling system includes a fore end coupling bracket attached to a fore end of the component, a first tie rod coupled to the fore end coupling bracket and a first portion of the primary structure, a second tie rod coupled to the fore end coupling bracket and a second portion of the primary structure, and a universal joint mount assembly coupled to an aft end of the component and a third portion of the primary structure. The first tie rod, the second tie rod, and the universal joint mount assembly attach the component to the primary structure such that the loads associated with the component are decoupled from the loads associated with the primary structure.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Embodiments of the present disclosure provide a load-decoupling attachment system that decouples components (such as avionics and propulsion components) from a primary structure, thereby eliminating, minimizing, or otherwise reducing stress in the component supporting hardware due to vehicle-level structural and thermal deformation. The load-decoupling attachment system includes a universal joint mount assembly and tie rods that decouple a component (such as avionics and/or propulsion components) from a primary structure.

The load-decoupling attachment system is configured to secure a component, such as a high pressure tank, within a vehicle, such as a launch vehicle. The tie rods are attached to a bracket on one end of the tank through spherical bearings secured to bracket lugs. The universal joint mount assembly is coupled to an opposite end of the tank. The load-decoupling attachment system provides freedom of movement to decouple loads associated with the vehicle.

In at least one embodiment, the load-decoupling attachment system includes a fore end coupling bracket that attaches to a fore end of a tank. The fore end coupling bracket has a pair of lugs thereon. A pair of tie rods having clevis ends are coupled to spherical bearings coupled to the lugs on the fore end bracket. A universal joint mount assembly includes a mounting bracket having a pair of yoke arms, an aft end coupling bracket that attaches to an aft end of the tank, having a pair of yoke arms, and a gimbal frame pivotally coupled to the yoke arms of the mounting bracket and the aft end coupling bracket. The tie rods and universal joint mount assembly are configured to respectively attach the tank to the structure of a launch vehicle such that the loads associated with the load-decoupling attachment system supporting the tank are decoupled from the loads associated with the structure to which the load-decoupling attachment system is attached. Additionally, the loads from growth of the high pressure tank to the primary structure are decoupled.

Figure 1:
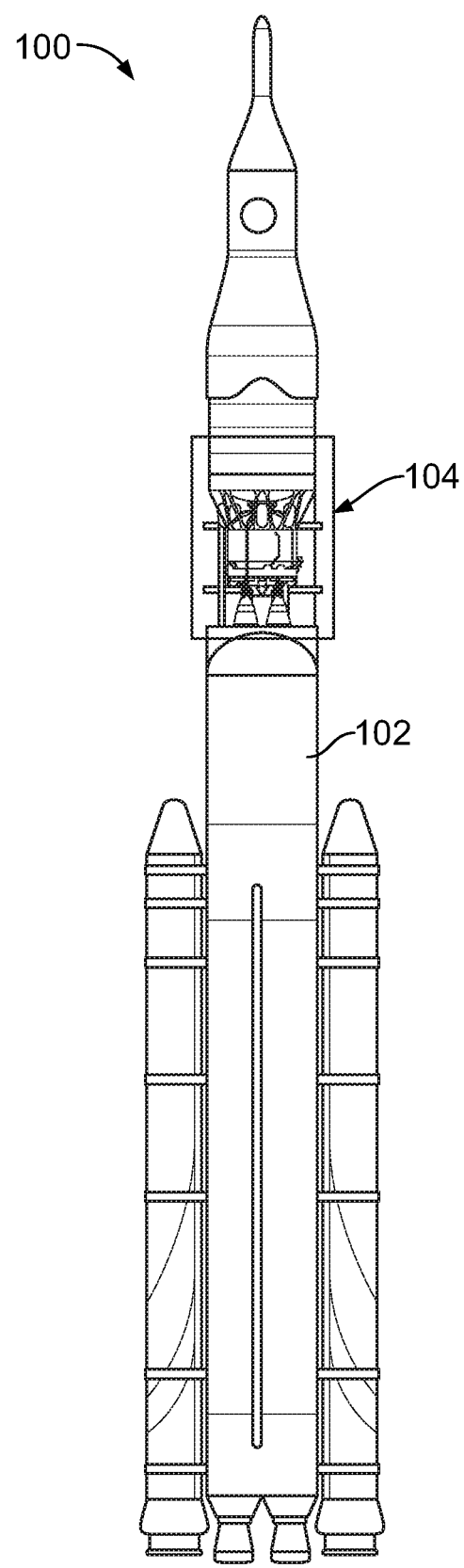
FIG. 1 illustrates a front view of a vehicle, according to an embodiment of the present disclosure.

FIG. 1 illustrates a front view of a vehicle 100, according to an embodiment of the present disclosure. The vehicle 100 is a space vehicle, such as a rocket. The vehicle 100 includes an integrally stiffened barrel (transparent for clarity), which may surround a portion of a vehicle stage 104. Optionally, embodiments of the present disclosure may be used with various other types of vehicles, such as airplanes, land-based vehicles, watercraft, and/or the like.

Figure 2:
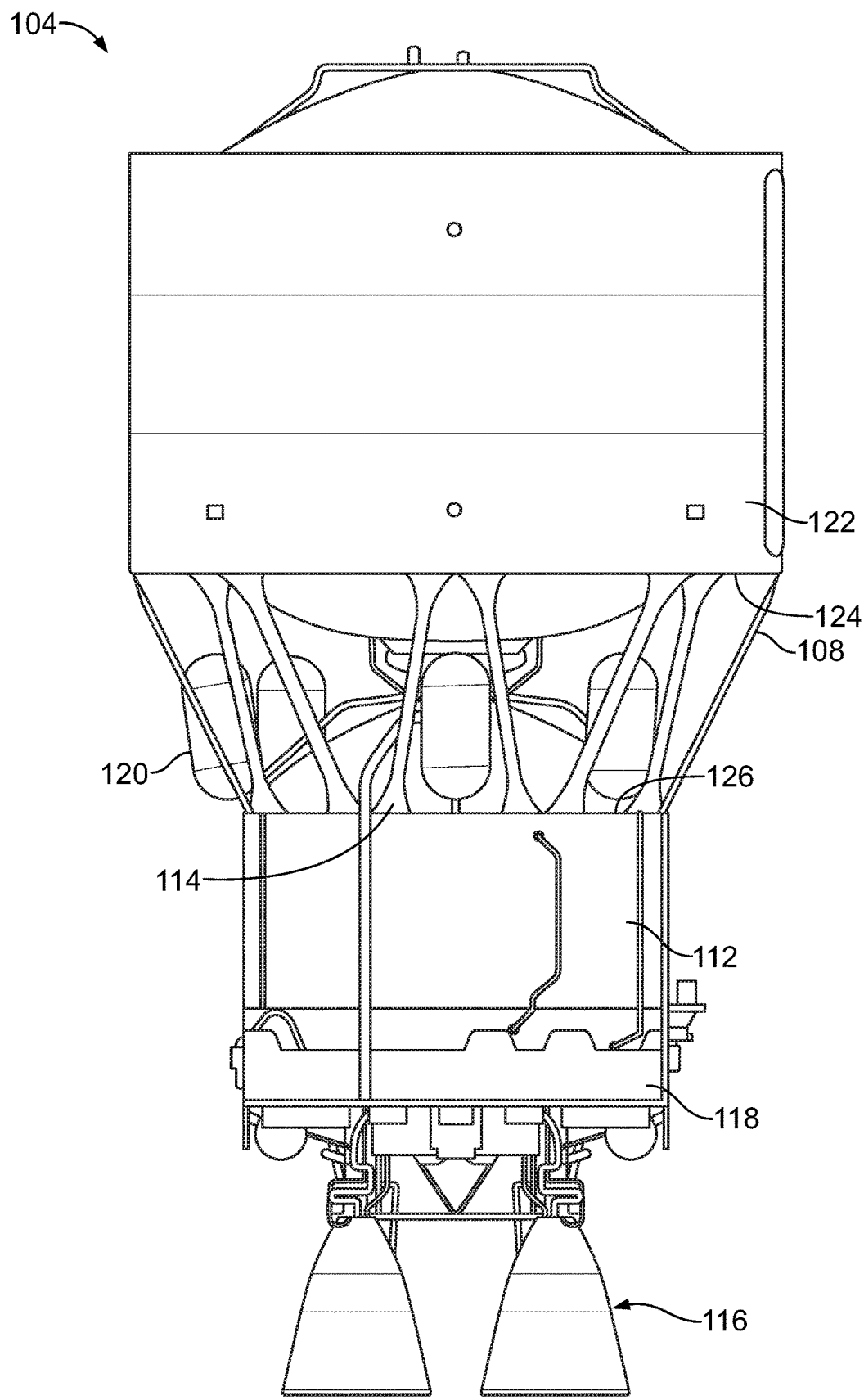
FIG. 2 illustrates a front view of a stage of the vehicle, according to an embodiment of the present disclosure.

FIG. 2 illustrates a front view of the vehicle stage 104, according to an embodiment of the present disclosure. The vehicle stage 104 includes a main body 106, a truss assembly 108 secured to stiffening ring 124 attached to the integrally stiffened barrel 122, a propellant tank 112 secured to an additional stiffening ring 126, and an engine assembly 116 secured to a beam assembly 118, which is coupled to the propellant tank 112.

One or more components, such as tanks 120 (for example, Helium tanks) are secured to the truss assembly 108 through load-decoupling attachment systems, as described herein. The load-decoupling attachment systems secure the components to a primary structure, such as the truss assembly 108, and decouple loads associated with the primary structure from the loads associated with the components, and vice versa.

Figure 3:
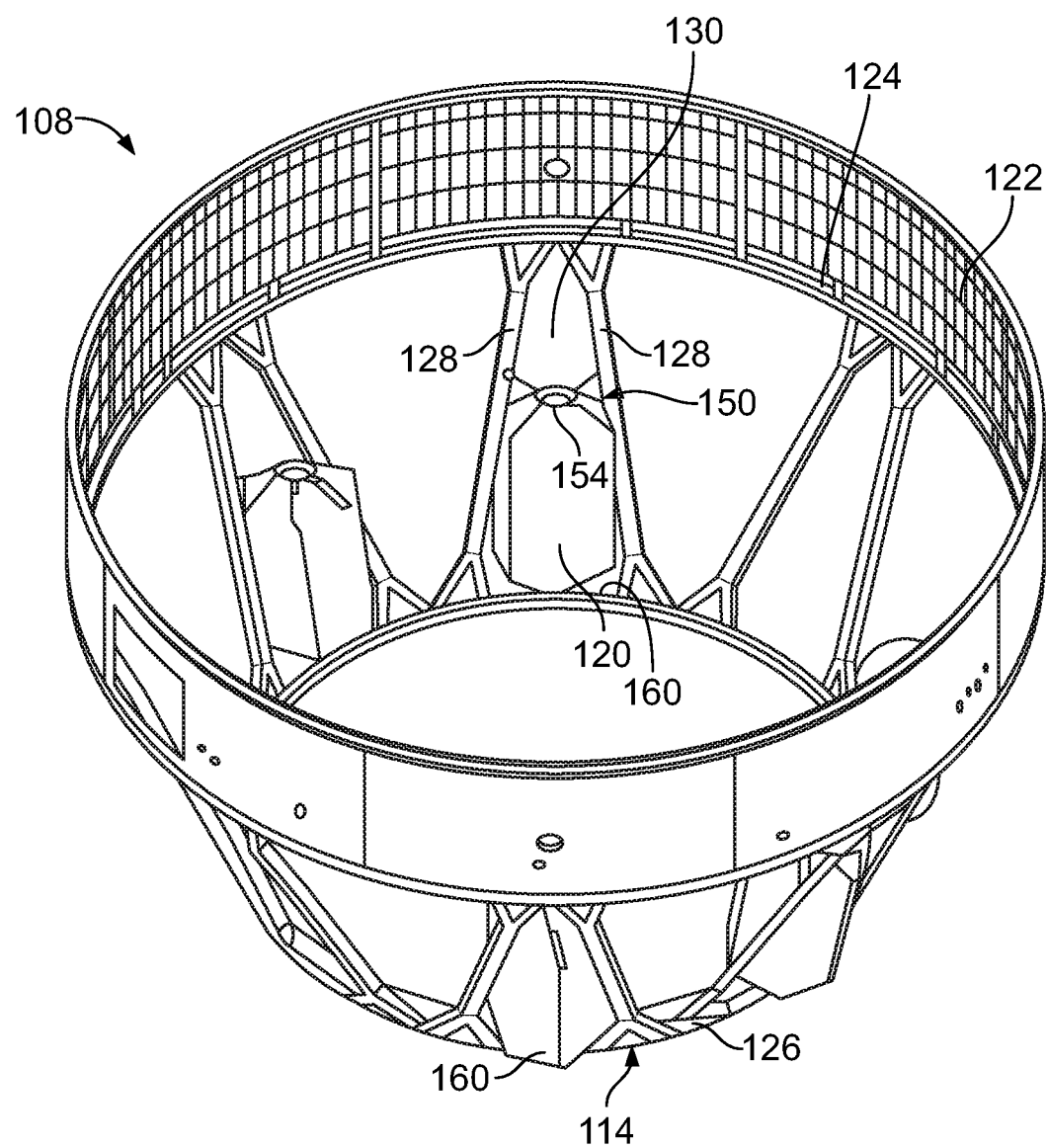
FIG. 3 illustrates a perspective top view of a truss assembly, according to an embodiment of the present disclosure.
Figure 4:
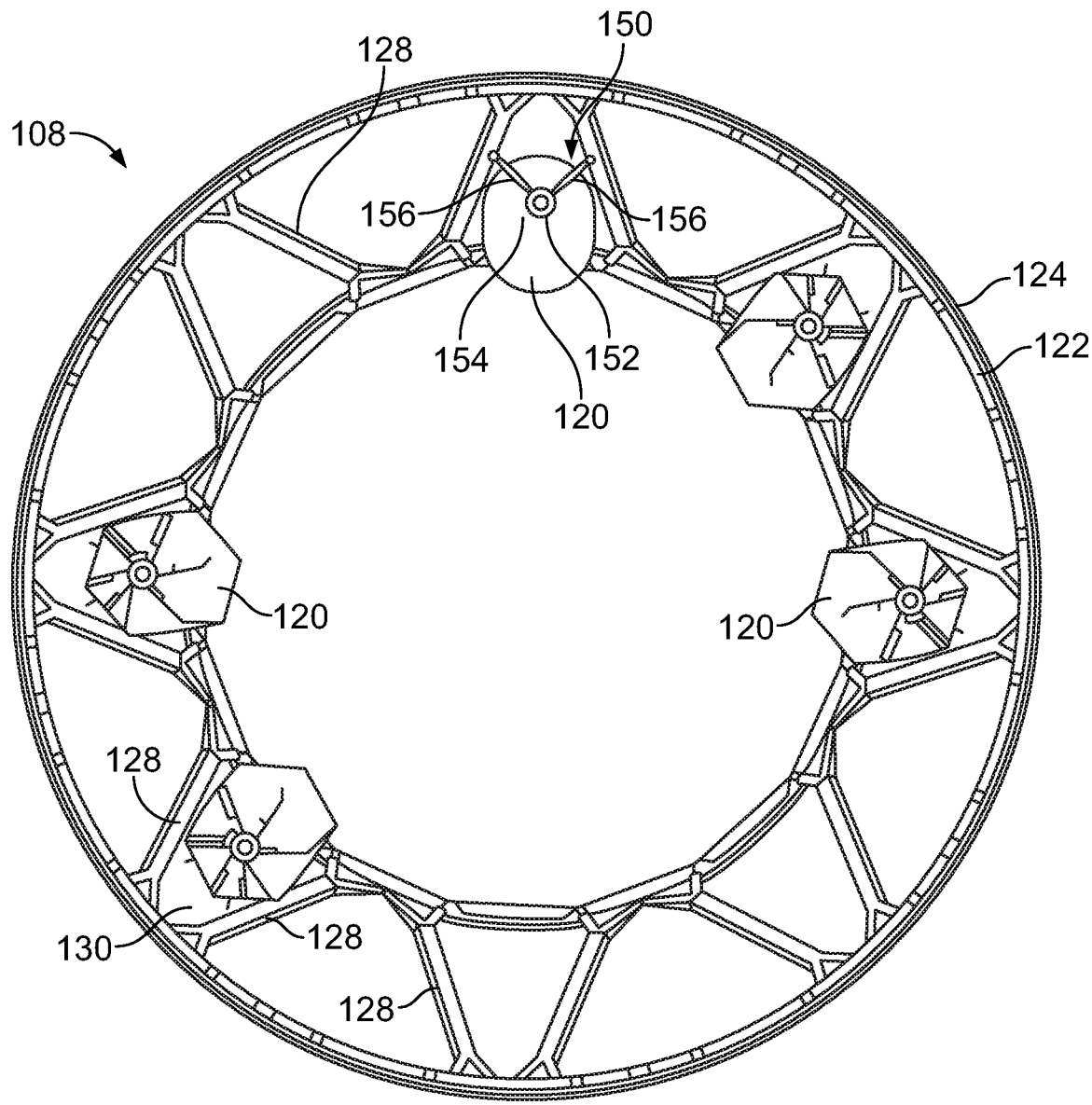
FIG. 4 illustrates a top view of the truss assembly.

FIG. 3 illustrates a perspective top view of the truss assembly 108, according to an embodiment of the present disclosure. FIG. 4 illustrates a top view of the truss assembly 108. The truss assembly 108 is an example of a primary structure to which components, such as the tanks 120, are secured. Optionally, the components may be various other structures, devices, systems, and/or the like, such as avionics components. The tanks 120 are merely examples of components.

The truss assembly 108 secures to an integrally stiffened barrel 122 through a stiffening ring 124 at a fore end and an additional stiffening ring 126 at the aft end 114. Angled struts 128 connect the barrel 122 to the stiffening ring 126.

Figure 5:
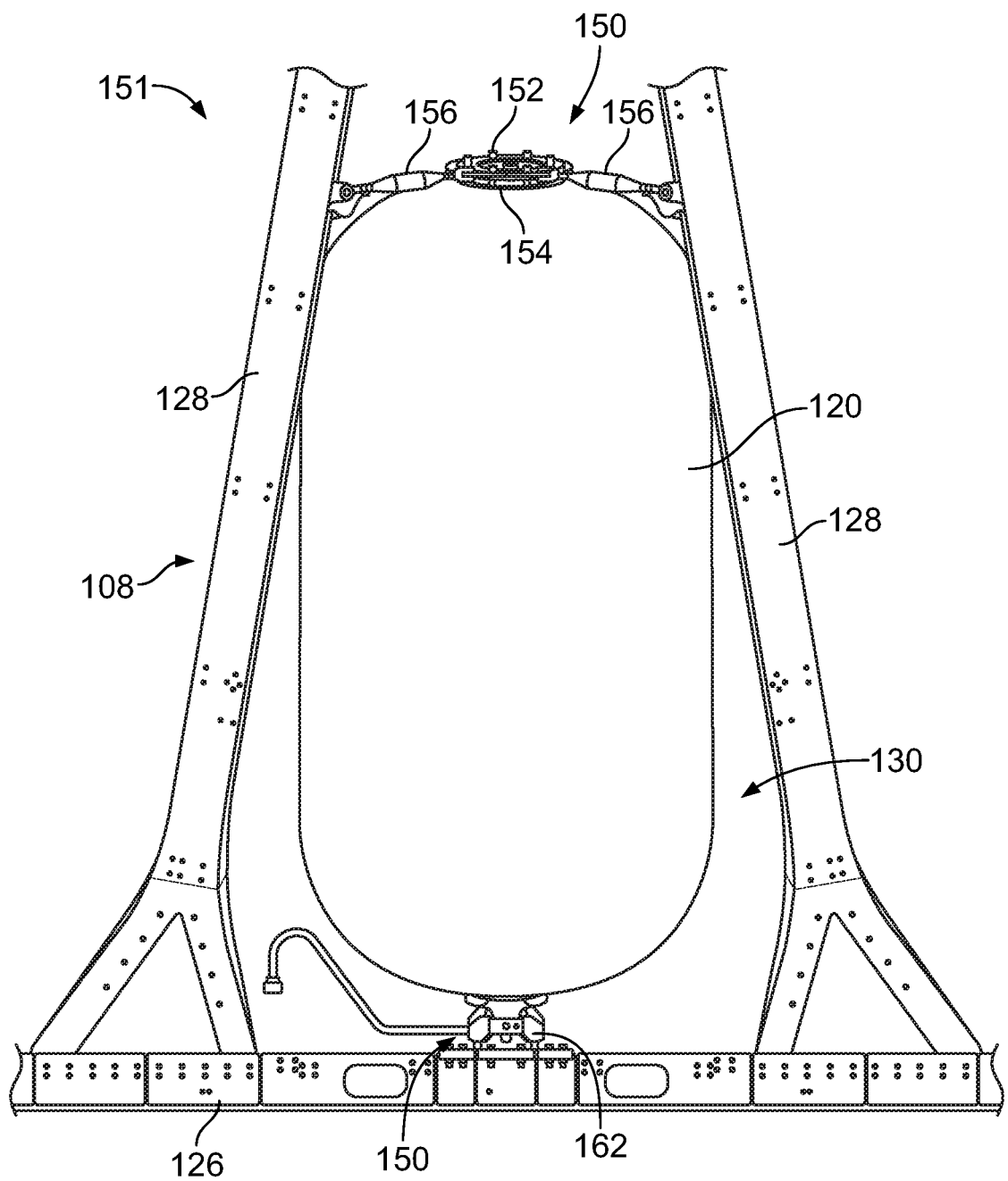
FIG. 5 illustrates a front view of a tank secured to the truss assembly with a load-decoupling attachment system, according to an embodiment of the present disclosure.

FIG. 5 illustrates a front view of a tank 120 secured to the truss assembly 108 with a load-decoupling attachment system 150, according to an embodiment of the present disclosure. FIG. 5 illustrates a load-isolating system 151 that includes a component, such as the tank 120, connected to a primary structure, such as the truss assembly 108, via the load-decoupling attachment system 150. The load-decoupling attachment system 150 isolates loads of the component and the primary structure from one another so that the loads are not transferred therebetween.

Referring to FIGS. 3-5, the tank 120 may be suspended within a space 130 between neighboring struts 128. The tank 120 is secured to the struts 128 via the load-decoupling attachment system 150, which includes a fore end coupling bracket 152 that attaches to a fore end 154 of the tank 120. The load-decoupling attachment system 150 also includes a pair of adjustable tie rods 156 (such as a first tie rod 156 and a second tie rod 156) coupled to the fore end coupling bracket 152 through spherical bearings. The load-decoupling attachment system 150 also includes a universal joint mount assembly 162 that attaches to an aft end 160 of the tank 120.

The first tie rod 156 is coupled to the fore end coupling bracket 152. The first tie rod 156 also couples to a first portion (such as a first strut 128) of the primary structure (such as the truss assembly 108). The second tie rod 156 is coupled to the fore end coupling bracket 152. The second tie rod 156 also couples to a second portion (such as a second strut 128) of the primary structure. The universal joint mount assembly 162 couples to the aft end 160 of the tank 120 and a third portion (such as the stiffening ring 126) of the primary structure.

Figure 6:
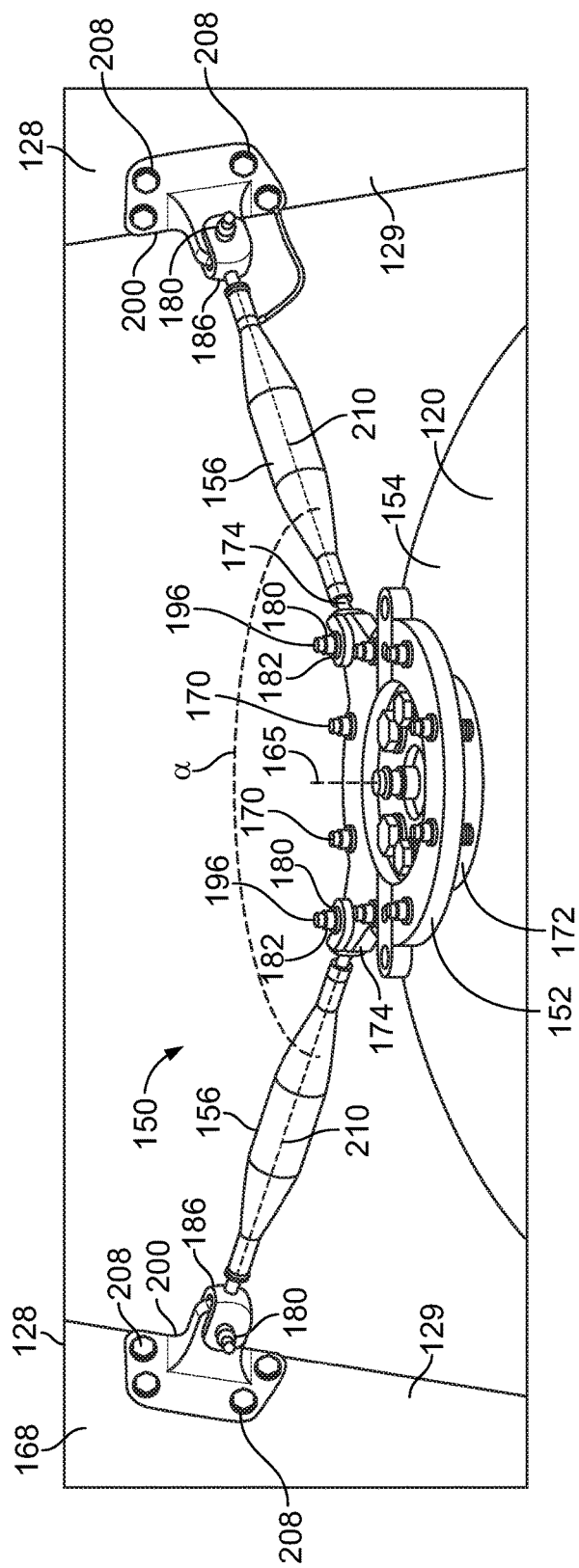
FIG. 6 illustrates a perspective top view of the tank secured to the truss assembly, according to an embodiment of the present disclosure.

FIG. 6 illustrates a perspective top view of the tank 120 secured to the truss assembly 108, according to an embodiment of the present disclosure. The load-decoupling attachment system 150 includes the fore end coupling bracket 152 that attaches to the fore end 154 of the tank 120.

Figure 7:
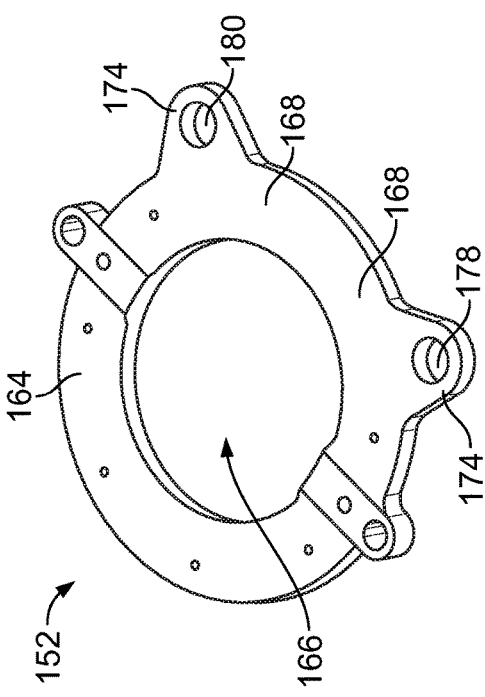
FIG. 7 illustrates a perspective top view of a fore end coupling bracket, according to an embodiment of the present disclosure.

FIG. 7 illustrates a perspective top view of the fore end coupling bracket 152, according to an embodiment of the present disclosure. The fore end coupling bracket 152 includes a collar 164 defining a central channel 166. A plurality of fastener through-holes 168 may be formed through the collar 164.

Referring to FIGS. 6 and 7, the fastener through holes 168 receive and retain fasteners 170 that secure the fore end coupling bracket 152 to a mating bracket 172 at the fore end 154 of the tank 120.

Lugs 174 (such as a first lug 174 and a second lug 174) extend radially outward from the collar 164. The lugs 174 define central passages 178 (or openings). The central passages 178 (or openings) receive and retain spherical bearings 180 within coupling devises 182 of the tie rods 156.

Figure 8:
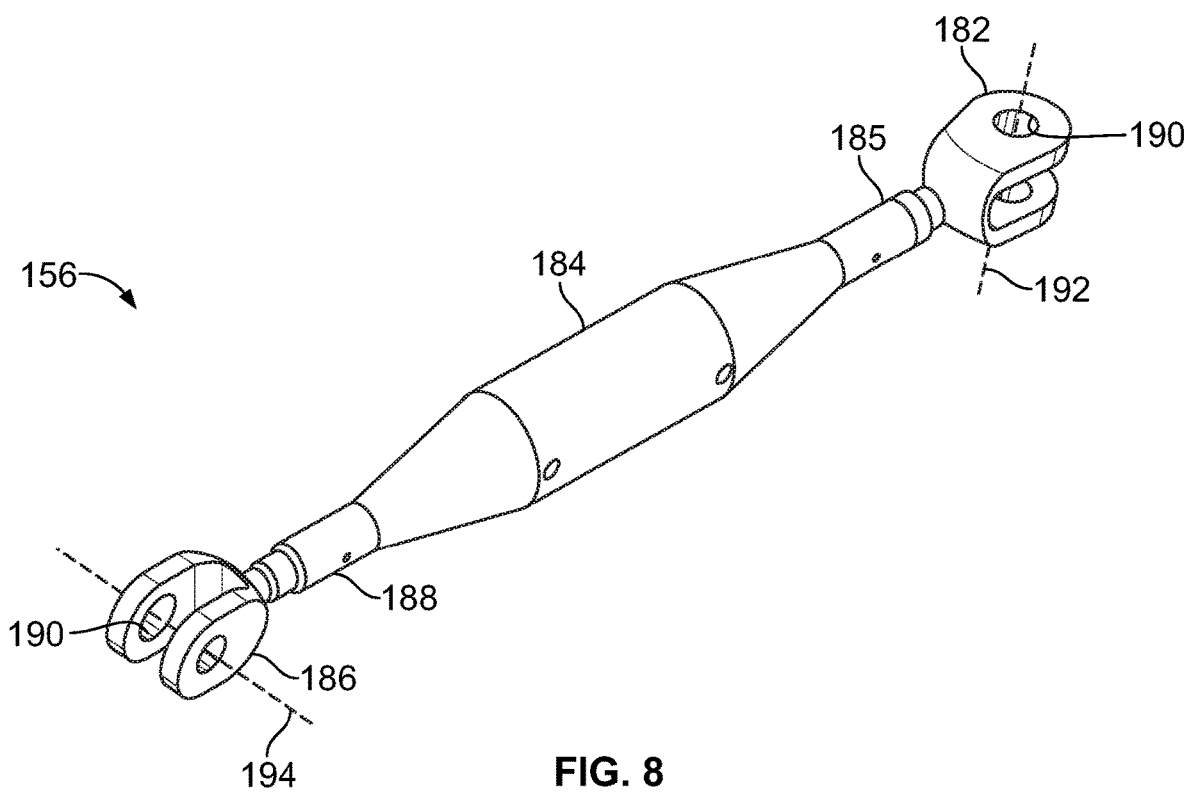
FIG. 8 illustrates a perspective top view of a tie rod, according to an embodiment of the present disclosure.

FIG. 8 illustrates a perspective top view of a tie rod 156, according to an embodiment of the present disclosure. The tie rod 156 includes a longitudinal support beam 184 that securely retains a (first) coupling clevis 182 at a first end 185 and a (second) coupling clevis 186 at a second end 188 that is opposite from the first end 185. The coupling devises 182 and 186 include fastener through-holes 190 that define axes 192 and 194 of the coupling devises 182 and 186. The axes 192 and 194 may be orthogonal to one another, as shown. In at least one embodiment, the tie rods 156 may be adjustable in length due to opposing ends having different thread direction (for example, left hand thread and right hand tread).

Referring to FIGS. 7 and 8, fasteners 196 extend into the fastener through-holes 190 and secure the spherical bearings 180 to the lugs 174. The coupling devises 186 connect to mounting protuberances 200 that securely couple to the struts 128.

Figure 9:
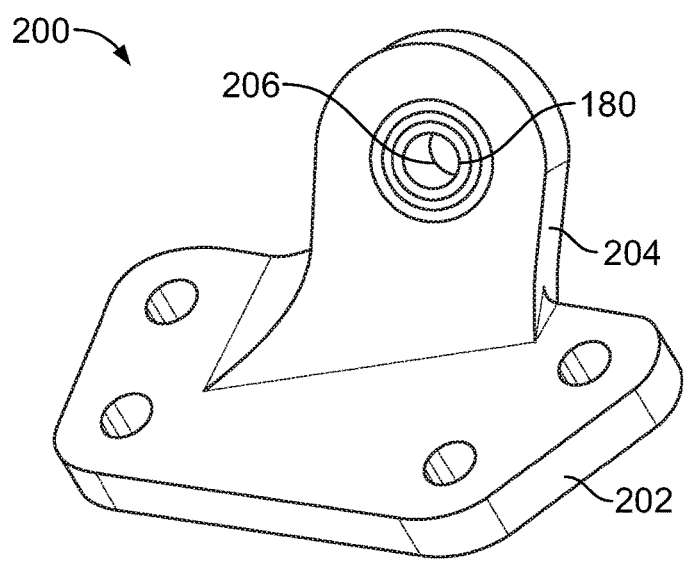
FIG. 9 illustrates a perspective top view of a mounting protuberance, according to an embodiment of the present disclosure.

FIG. 9 illustrates a perspective top view of a mounting protuberance 200, according to an embodiment of the present disclosure. The mounting protuberance 200 includes a panel 202 and a fin 204 upwardly extending from the panel 202. A channel 206 is formed through the fin 204. Referring to FIGS. 6 and 9, the channel 206 receives and retains the spherical bearing 180. The panel 202 is secured to interior surfaces 129 of the struts 128 through a plurality of fasteners 208. As shown, the mounting protuberances 200 may be separately secured to the struts 128. In at least one embodiment, the mounting protuberances 200 are integrally formed with the struts 128.

Each of the tie rods 156 defines a longitudinal axis 210. The longitudinal axes 210 of the tie rods 156 are not longitudinally aligned with one another. That is, the tie rods 156 are set at an angle a with respect to one another. Accordingly, relative deflections of the coupling devises 182 and 186 do not result in additional loads to the tie rods 156.

Figure 10:
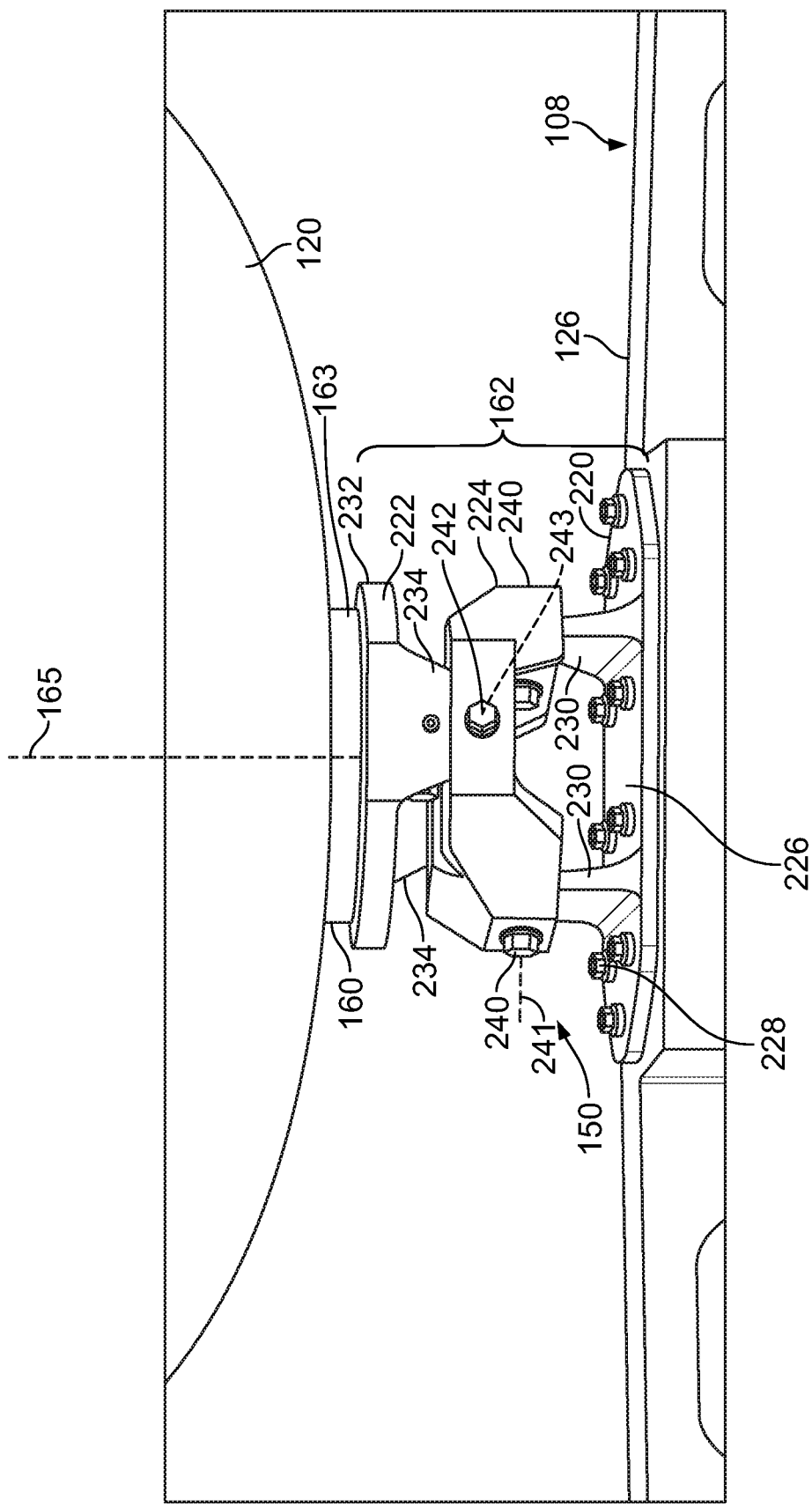
FIG. 10 illustrates a perspective bottom view of the tank secured to the truss assembly, according to an embodiment of the present disclosure.

FIG. 10 illustrates a perspective bottom view of the tank 120 secured to the truss assembly 108, according to an embodiment of the present disclosure. The load-decoupling attachment system 150 includes the universal joint mount assembly 162 that attaches to the aft end 160 of the tank 120.

The universal joint mount assembly 162 includes a mounting bracket 220, an aft end coupling bracket 222, and a gimbal frame 224. The mounting bracket 220 includes a planar base 226 that secures to the stiffening ring 126 through a plurality of fasteners 228. Yoke arms 230 (such as first yoke arms) upwardly extend from the base 226. The aft end coupling bracket 222 includes a collar 232 that secures around a coupling stud 163 that downwardly extends from the tank 120. Yoke arms 234 (such as second yoke arms) downwardly extend from the collar 232. The gimbal frame 224 pivotally couples to the yoke arms 230 of the mounting bracket 220 and the yoke arms 234 of the aft end coupling bracket 222. In particular, the gimbal frame 224 pivotally couples to the yoke arms 230 via pivot pins 240, and pivotally couples to the yoke arms 234 via pivot pins 242. The pivot pins 240 define a first pivot axle 241, and the pivot pins 242 define a second pivot axle 243. The first pivot axle 241 is orthogonal to the second pivot axle 243. The universal joint mount assembly 162 allows the tank 120 to articulate and pivot about the pivot axles 241 and 243, and constrain rotation of the tank 120 about a longitudinal axis 165.

Referring to FIGS. 6 and 10, the tied rods 156 and the universal joint mount assembly 162 of the load-decoupling attachment system 150 attach the tank 120 (or another such component) to the truss assembly 108 (or another such primary structure). The loads associated with the tank 120 and/or the load-decoupling attachment system 150 are decoupled from the loads associated with the truss assembly 108. That is, the load-decoupling attachment system 150 operates to decouple loads associated with the truss assembly 108 and the tank 120 from one another.

The tie rods 156, which are set at the angle a in relation to one another, are not longitudinally aligned. Movement of the struts 128 towards and away from one another, causes the angle a to change, while the tank 120 remains in a suspended orientation. The spherical bearings 180 coupled to the tie rods 156 provide rotational freedom. The fore end coupling bracket 152 rotationally constrains the tank 120, thereby preventing the tank 120 from rotating about its longitudinal axis 165.

The load-decoupling attachment system 150 decouples load transmissions between the tank 120 and the truss assembly 108. Further, the load-decoupling attachment system 150 securely supports the tank 120 with respect to the truss assembly 108, while eliminating, minimizing, or reducing internal loads that may be caused by thermal and structural deflections associated with the primary structure (for example, the truss assembly 108). In at least one embodiment, the pinned joints thermally isolate the temperature of the truss assembly 108 (due to cryogenic propellant tank 112) from the truss assembly 108. For example, the tank 112 may be cold, and the pinned joints thermally isolate components (such as avionics components), thereby ensuring that the components do not become cold (or too cold).

The load-decoupling attachment system 150 may be advantageously utilized with respect to a primary structure of a space launch vehicle to support various avionics and propulsion components, and eliminate, minimize, or otherwise reduce issues related to structural, high pressure vessel, and thermal deflection. The load-decoupling attachment system 150 leads to a lighter and less costly truss frame design that may be used with various vehicles.

Figure 11:
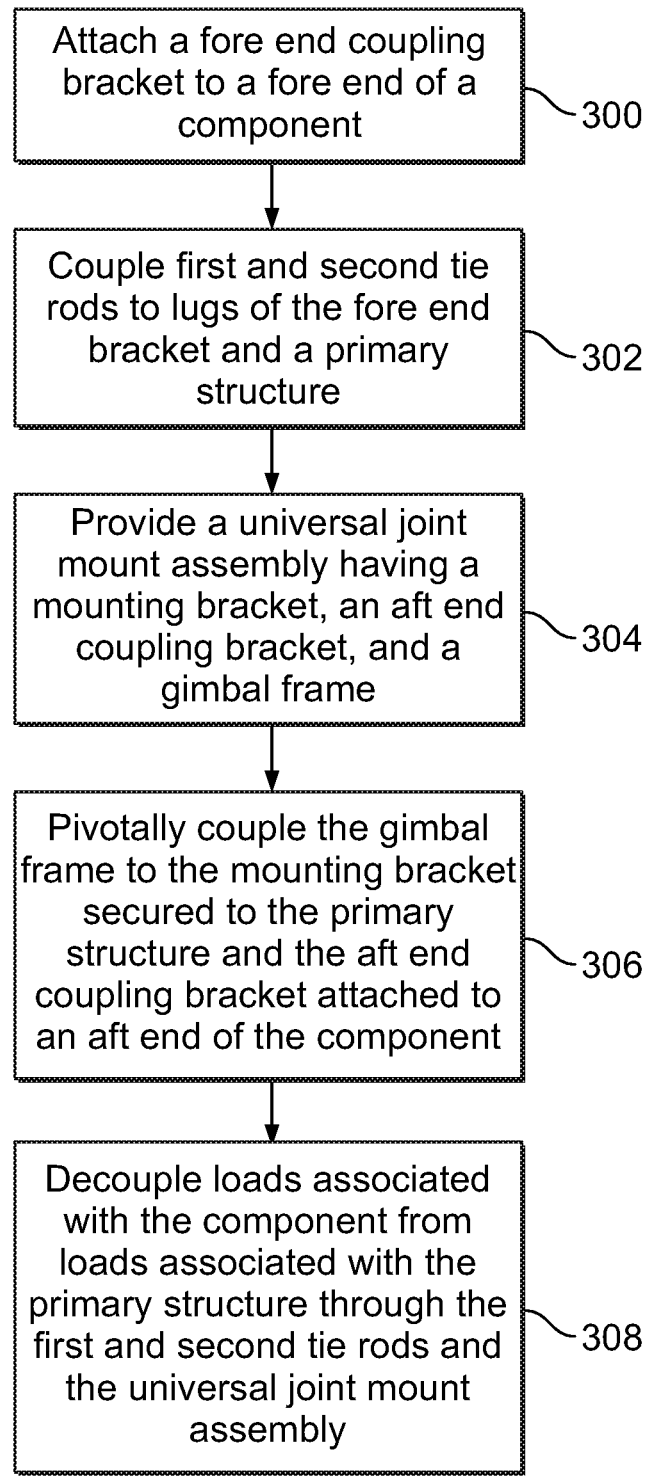
FIG. 11 illustrates a flow chart of a method of securing a component to a primary structure with a load-decoupling attachment system, according to an embodiment of the present disclosure.

FIG. 11 illustrates a flow chart of a method of securing a component to a primary structure with a load-decoupling attachment system, according to an embodiment of the present disclosure. Referring to FIGS. 3-11, at 300, a fore end coupling bracket 152 is attached to a fore end 154 of a component, such as the tank 120. The mounting protuberances 200 may be attached to a primary structure. At 302, first and second tie rods 156 are coupled to the lugs 174 of the fore end coupling bracket 152 and a primary structure, such as the struts 128 of the truss assembly 108.

At 304, the universal joint mount assembly 162 having the mounting bracket 220, the aft end coupling bracket 222, and the gimbal frame 224 is provided. At 306, the gimbal frame 224 is pivotally coupled to the mounting bracket 220, which is secured to the primary structure, and the aft end coupling bracket 222, which is attached to the aft end of the component. At 308, the load-decoupling attachment system 150 operates to decouple loads associated with the component from loads associated with the primary structure through the first and second tie rods 156 and the universal joint mount assembly 162.

As described herein, embodiments of the present disclosure provide a load-decoupling attachment system that decouples load transmission between a component and a primary structure. Further, the load-decoupling attachment system structurally isolates avionics and propulsion components from a primary load path within a vehicle, and may thermally isolate from temperatures of surrounding structure.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A load-decoupling attachment system that is configured to secure a component to a primary structure, the load-decoupling system comprising:
    a fore end coupling bracket that is configured to attach to a fore end of the component;
    a first tie rod coupled to the fore end coupling bracket, the first tie rod configured to couple to a first portion of the primary structure;
    a second tie rod coupled to the fore end coupling bracket, the second tie rod configured to couple to a second portion of the primary structure; and
    a universal joint mount assembly that is configured to couple to an aft end of the component and a third portion of the primary structure.

2. The load-decoupling attachment system of claim 1, wherein the first tie rod, the second tie rod, and the universal joint mount assembly are configured to attach the component to the primary structure such that loads associated with the component are decoupled from loads associated with the primary structure.

3. The load-decoupling attachment system of claim 1, wherein the fore end coupling bracket comprises a first lug and a second lug, wherein the first tie rod couples to the first lug, and the second tie rod couples to the second lug.

4. The load-decoupling attachment system of claim 1, wherein each of the first tie rod and the second tie rod is coupled to a spherical bearing that is received and secured within the first lug and the second lug in the fore end coupling bracket.

5. The load-decoupling attachment system of claim 1, wherein the universal joint mount assembly comprises:
    a mounting bracket having first yoke arms;
    an aft end coupling bracket that is configured to attach to the aft end of the component, the aft end coupling bracket having second yoke arms; and
    a gimbal frame pivotally coupled to the first yoke arms of the mounting bracket and the second yoke arms of the aft end coupling bracket.

6. The load-decoupling attachment system of claim 1, wherein the component is an avionics or propulsion component of a vehicle, and wherein the primary structure is a frame within the vehicle.

7. The load-decoupling attachment system of claim 1, wherein each of the first tie rod and the second tie rod comprises a longitudinal support beam that securely retains a first coupling clevis at a first end and a second coupling clevis at a second end that is opposite from the first end, wherein each of the first coupling clevis and the second coupling clevis is coupled to a spherical bearing that is received and secured within the first lug and the second lug in the fore end coupling bracket.

8. The load-decoupling attachment system of claim 1, further comprising:

a first mounting protuberance that is configured to couple the first tie rod to the first portion of the primary structure; and
a second mounting protuberance that is configured to couple the second tie rod to the second portion of the primary structure.

9. The load-decoupling attachment system of claim 8, wherein each of the first mounting protuberance and the second mounting protuberance comprises a panel and a fin extending from the panel, wherein a channel is formed through the fin, and wherein the channel retains a spherical bearing of a coupling clevis of one of the first tie rod or the second tie rod.

10. The load-decoupling attachment system of claim 1, wherein the first tie rod and the second tie rod connect to the fore end coupling bracket at an angle therebetween.

11. The load-decoupling attachment system of claim 1, wherein longitudinal axes of the first tie rod and the second tie rod are not longitudinally aligned.

12. A load-isolating system comprising:
a primary structure;
a component; and
a load-decoupling attachment system that connects the component to the primary structure, the load-decoupling system comprising:
a fore end coupling bracket attached to a fore end of the component;
a first tie rod coupled to the fore end coupling bracket and a first portion of the primary structure;
a second tie rod coupled to the fore end coupling bracket and a second portion of the primary structure; and
a universal joint mount assembly coupled to an aft end of the component and a third portion of the primary structure,
wherein the first tie rod, the second tie rod, and the universal joint mount assembly attach the component to the primary structure such that loads associated with the component are decoupled from loads associated with the primary structure.

13. The load-isolating system of claim 12, wherein the fore end coupling bracket comprises a first lug and a second lug, wherein the first tie rod couples to the first lug, and the second tie rod couples to the second lug.

14. The load-isolating system of claim 12, wherein each of the first tie rod and the second tie rod is coupled to a spherical bearing that is received and secured within the first lug and the second lug in the fore end coupling bracket.

15. The load-isolating system of claim 12, wherein the universal joint mount assembly comprises:
a mounting bracket having first yoke arms;
an aft end coupling bracket attached to the aft end of the component, the aft end coupling bracket having second yoke arms; and
a gimbal frame pivotally coupled to the first yoke arms of the mounting bracket and the second yoke arms of the aft end coupling bracket.

16. The load-isolating system of claim 12, wherein the component is an avionics or propulsion component of a vehicle, and wherein the primary structure is a frame within the vehicle.

17. The load-isolating system of claim 12, wherein each of the first tie rod and the second tie rod comprises a longitudinal support beam that securely retains a first coupling clevis at a first end and a second coupling clevis at a second end that is opposite from the first end, wherein each of the first coupling clevis and the second coupling clevis is coupled to a spherical bearing that is received and secured within the first lug and the second lug in the fore end coupling bracket.

18. The load-isolating system of claim 12, further comprising:
a first mounting protuberance that couples the first tie rod to the first portion of the primary structure; and
a second mounting protuberance that couples the second tie rod to the second portion of the primary structure,
wherein each of the first mounting protuberance and the second mounting protuberance comprises a panel and a fin extending from the panel, wherein a channel is formed through the fin, and wherein the channel retains a spherical bearing.

19. The load-isolating system of claim 12, wherein the first tie rod and the second tie rod connect to the fore end coupling bracket at an angle therebetween.

20. The load-isolating system of claim 12, wherein longitudinal axes of the first tie rod and the second tie rod are not longitudinally aligned.

* * * * *